(12) United States Patent
Xing

(10) Patent No.: US 11,781,431 B2
(45) Date of Patent: Oct. 10, 2023

(54) HIGH-TEMPERATURE HIGH-EFFICIENCY EXPLOSION-PROOF INTEGRATED MODULAR DUST REMOVAL EQUIPMENT FOR PYROLYSIS RAW COAL GAS

(71) Applicant: Guoke Yongji (Beijing) Engineering Installation Co., Ltd., Beijing (CN)

(72) Inventor: Qianfu Xing, Beijing (CN)

(73) Assignee: Guoke Yongji (Beijing) Engineering Installation Co., Ltd., Beijing (CN)

( * ) Notice: Subject to any disclaimer, the term of this patent is extended or adjusted under 35 U.S.C. 154(b) by 212 days.

(21) Appl. No.: 17/404,319

(22) Filed: Aug. 17, 2021

(65) Prior Publication Data

US 2022/0145760 A1 May 12, 2022

(30) Foreign Application Priority Data

Nov. 10, 2020 (CN) .......................... 202011247989.8

(51) Int. Cl.
*E21F 5/20* (2006.01)
*E21F 5/04* (2006.01)
*B01D 46/00* (2022.01)
*B01D 46/24* (2006.01)
*B01D 46/71* (2022.01)

(52) U.S. Cl.
CPC .......... *E21F 5/20* (2013.01); *B01D 46/24491* (2021.08); *B01D 46/71* (2022.01); *E21F 5/04* (2013.01)

(58) Field of Classification Search
CPC .......... E21F 5/20; E21F 5/04; B01D 46/2491; B01D 46/71

USPC ........................................................ 55/302
See application file for complete search history.

(56) References Cited

U.S. PATENT DOCUMENTS 5,318,755 A * 6/1994 Kuivalainen ............ F23J 15/02
422/177

FOREIGN PATENT DOCUMENTS

| CN | 106422562 A | * | 2/2017 | |
| CN | 111440640 A | * | 7/2020 | |
| WO | WO-2013173951 A1 | * | 11/2013 | F23G 5/027 |

\* cited by examiner

*Primary Examiner* — Robert A Hopkins
*Assistant Examiner* — Qianping He
(74) *Attorney, Agent, or Firm* — Myers Bigel, P.A.

(57) ABSTRACT

A high-temperature high-efficiency explosion-proof integrated modular dust removal equipment for pyrolysis raw coal gas, including: a housing internally provided with a chamber, the chamber being enabled a medium to flow from a gas inlet to a gas outlet of the housing; a high-temperature ceramic filter system for dividing the chamber into a dust collection chamber and a gas purification chamber that are individual, and being located in the dust collection chamber to communicate the dust collection chamber and the gas purification chamber; a high-pressure backblow system located in the gas purification chamber and used for performing blowback operation towards the dust collection chamber; and a preliminary dust removal system positioned outside the housing and communicated with the dust collection chamber.

8 Claims, 4 Drawing Sheets

HIGH-TEMPERATURE HIGH-EFFICIENCY EXPLOSION-PROOF INTEGRATED MODULAR DUST REMOVAL EQUIPMENT FOR PYROLYSIS RAW COAL GAS

CROSS REFERENCE TO RELATED APPLICATIONS

This patent disclosure claims the benefit and priority of Chinese Patent Application No. 202011247989.8, filed on Nov. 10, 2020, the disclosure of which is incorporated by reference herein in its entirety as part of the present disclosure.

TECHNICAL FIELD

The present disclosure relates to the technical field of the dust removal and the purification for the coal gasification, and in particular, to high-temperature high-efficiency explosion-proof integrated modular dust removal equipment for pyrolysis raw coal gas.

BACKGROUND ART

The coal gasification is a process for producing combustible gas by introducing air, water vapor, hydrogen, or the like into coal or coal char under the conditions of high temperature and high pressure. The coal gasification is an important way and means of the clean utilization of coal resources.

The application of a coal gasification combined with a cycle power generation system better promotes the development of a coal gasification technology. However, the high-temperature coal gas produced by the coal gasification contains a large amount of dust, which not only reduces the quality of the coal gas, but also causes the abrasion on blades of a gas turbine, and further decreases the service life and the work efficiency of the gas turbine. So, it is necessary to perform the treatments of the dust removal and the purification on the high-temperature coal gas produced by the coal gasification.

As shown in FIG. 1, the current dust removal process in the coal gasification is as follows. High-temperature dust-containing raw coal gas discharged from an outlet of a coal gasification furnace 7 is introduced into a waste heat recovery system 8 firstly, and then is introduced into a bag-type dust remover 9 for dust removal treatment after the raw coal gas is cooled below 200° C. The coal gas after the preliminary dust removal is transferred into a washing tower 10, and then is deeply purified and cooled through cooling water. At this time, the temperature of the clean coal gas has basically reached the normal temperature. The treated coal gas enters a drop catcher 20, so that the liquid drops carried in the coal gas are caught. Finally, the coal gas is transported to a gas consumption point to use by a presser according to the required pressure.

The composition of the high-temperature dust-containing raw coal gas is very complex. The raw coal gas has the initial temperature of about 500° C. to 800° C., and is sensitive to the change of temperature. Thus, tar coagulates easily when the temperature decreases. In the above-mentioned process flow, after the tar is separated out from the raw coal gas due to cooling, the tar will agglomerate with dust particles and adhere to the surface of the inner wall of the equipment, thereby causing the blockage of the equipment and pipelines, and seriously affecting the service life of a dust removal device.

SUMMARY

In view of the above-mentioned problems, the present disclosure provides high-temperature high-efficiency explosion-proof integrated modular dust removal equipment for pyrolysis raw coal gas.

The present disclosure provides the high-temperature high-efficiency explosion-proof integrated modular dust removal equipment for pyrolysis raw coal gas, which includes: a housing, the housing being internally provided with a chamber that enables a medium to flow from a gas inlet of the housing to a gas outlet of the housing; a high-temperature ceramic filter system, the high-temperature ceramic filter system being used for dividing the chamber of the housing into a dust collection chamber and a gas purification chamber that are individual; and the high-temperature ceramic filter system being positioned in the dust collection chamber to communicate the dust collection chamber and the gas purification chamber; a high-pressure backblow system, the high-pressure backblow system being mounted in the gas purification chamber, and being used for performing backblow operation towards the dust collection chamber; and a preliminary dust removal system, the preliminary dust removal system being positioned outside the housing, and being communicated with the dust collection chamber.

By adopting the above-mentioned technical solution, the gas outlet of the housing is externally connected to a high-power induced draft fan which pumps gas outwards discontinuously, so as to form a negative pressure in the gas purification chamber. In this way, when the dust removal equipment works, first, large particle dust removal treatment is performed on the high-temperature dust-containing raw coal gas that is not subjected to cooling treatment by the preliminary dust removal system; then, fine dust particle filtration is performed through the high-temperature ceramic filter system; and finally, the raw coal gas is discharged from the gas outlet of the housing to enter the next flow. The high-pressure backblow system is used for performing backblow on the high-temperature ceramic filter system to clean dust, so as to guarantee the filtering performance of the high-temperature ceramic filter system.

During the dust removal process, the dust removal equipment is directly connected to an outlet of a pyrolysis furnace to effectively remove the dust of 0.3 μm contained in the raw coal gas under the working condition of 300° C. to 700° C. In this way, the requirement of the fine coal gas of 5 mg/Nm3 is satisfied after the primary filtration. The dust removal equipment has the advantages of strong acid resistance and alkali resistance, small thermal inertia, and ultra-long service life of 6 to 8 years. So, it is directly to overcome the difficulties of pipe blockage, sintering, and re-separation of the dust of below 2 μm and the like in the current coal gasification process. Furthermore, the risks of combustion and explosion in the safe production are reduced.

Optionally, the high-temperature ceramic filter system includes a mounting plate with patterned holes, and ceramic fiber filter tubes each of which is arranged in a corresponding one of the patterned holes of the mounting plate; the chamber of the housing is horizontally partitioned by the mounting plate; and the ceramic fiber filter tubes are vertically arranged in the dust collection chamber.

By adopting the above-mentioned technical solution, the coal gas enters the gas purification chamber through the ceramic fiber filter tubes during filtering, and then is discharged from the gas outlet of the housing. However, the dust particles are blocked outside the ceramic fiber filter tubes. In this way, the filtration of the coal gas is realized.

Optionally, the ceramic fiber filter tubes are made of a high temperature resistant ceramic material; pore size ranges of the ceramic fiber filter tubes are each 0.1-5 μm, and porosity ranges of the ceramic fiber filter tubes are each 30-40%.

By adopting the above-mentioned technical solution, the ceramic fiber filter tubes select the above-mentioned material and size to ensure the high purification rate and the long service life.

Optionally, the high-pressure backblow system includes a blowback gas bag mounted outside the housing, purging pipes mounted in the gas purification chamber, and blowback pipelines that each connect the blowback gas bag and a corresponding one of the purging pipes; the purging pipes and the ceramic fiber filter tubes have a same number, distribution positions of the purging pipes are in one-to-one correspondence with distribution positions of the ceramic fiber filter tubes, and each of output ends of the purging pipes extends into a corresponding one of the ceramic fiber filter tubes; a control valve is individually provided between each of the blowback pipelines and the corresponding one of the purging pipes.

By adopting the above-mentioned technical solution, gas in the blowback gas bag is ejected from the purging pipes at a high speed to perform backblow on the ceramic fiber filter tubes to clean dust. Dust cakes fall into the bottom of the housing under the action of gravity to complete the cleaning of the ceramic fiber filter tubes. The control valve controls the opening and closing of the high-pressure backblow system.

Optionally, a double-pipe water cooler is mounted outside each of the purging pipes.

By adopting the above-mentioned technical solution, the water cooler is used for controlling the temperature of the gas circulating in the blowback pipelines, so as to prevent the high temperature inside the housing from being transferred into the blowback gas bag to affect the stability of the high-pressure blowback gas.

Optionally, the preliminary dust removal system includes a preliminary dust remover and a cinder valve mounted at a bottom of the preliminary dust remover; a gas inlet of the preliminary dust remover is communicated with a high-temperature raw gas source; and a gas outlet of the preliminary dust remover is communicated with the dust collection chamber.

By adopting the above-mentioned technical solution, the flow velocity of the gas flow of the raw coal gas suddenly is decreased and the flow direction of the gas flow is changed in the preliminary dust remover, so the large particle dust is separated from the gas flow and is settled to the bottom of the preliminary dust remover under the actions of the gravity and the inertial force, so as to realize the pre-treatment of the raw coal gas.

Optionally, an air cooler is mounted inside the preliminary dust remover; and a fan is mounted on the air cooler.

By adopting the above-mentioned technical solution, the cooling fan and the air cooler are cooperated to control the temperature of the raw coal gas in the preliminary dust remover and control the temperature of the raw coal gas below 700° C., so as to ensure the normal and stable work of the high-temperature ceramic filter system.

Optionally, gas that is blown back in the high-pressure backblow system is nitrogen.

Optionally, a heat-insulating layer is coated outside the housing.

By adopting the above-mentioned technical solution, the thermal efficiency of the housing is improved, and the high temperature of the purified coal gas is ensured.

In conclusion, the present disclosure includes at least one of the following beneficial effects. 1. The dust removal equipment can directly filter the high-temperature dust-containing raw coal gas, which improves the situation that the raw coal gas needs to be cooled before being filtered by a bag dust removal device in the current coal gasification process, effectively solves the difficult problems of pipe blockage, sintering, re-separation of the dust below 2 μm and the like, and reduces the risks of combustion and explosion in the safe production. 2. The regeneration of a cleaning function of the ceramic fiber filter tubes can be realized through the high-pressure backblow system, so as to guarantee the dust cleaning efficiency of a fiber plate. 3. Temperature control mechanisms are added in the high-pressure backblow system and the preliminary dust removal system, which can effectively improve the safety and stability of the present equipment and prolong the service life of the present equipment.

Figure 1:
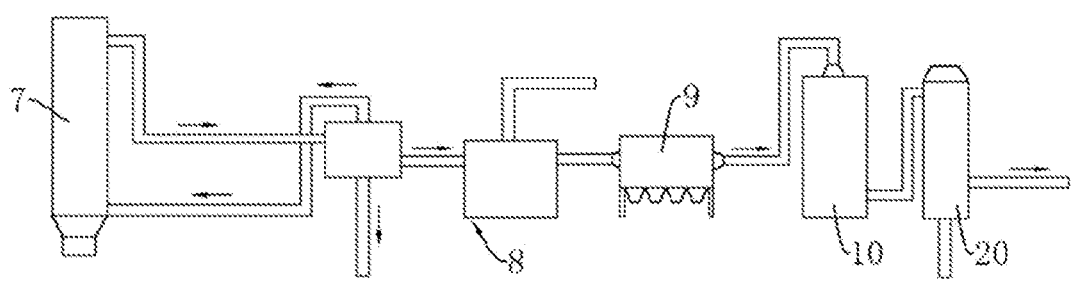
FIG. 1 is a schematic diagram of a current dust removal process for coal gasification.

Reference numerals in drawings: 1—housing; 11—gas purification chamber; 12—dust collection chamber; 2—high-temperature ceramic filter system; 21—mounting plate; 22—ceramic fiber filter tube; 3—high-pressure blowback system; 31—blowback gas bag; 32—blowback pipeline; 33—purging pipe; 34—control valve; 35—double-pipe water cooler; 36—bracket; 4—preliminary dust removal system; 41—preliminary dust remover; 42—air cooler; 43—cooling fan; 5—cinder valve; 6—dust collecting tank; 7—coal gasification furnace; 8—waste heat recovery system; 9—bag-type dust remover; 10—washing tower; 20—drop catcher.

DETAILED DESCRIPTION OF THE EMBODIMENTS

The present disclosure is further described below in detail with reference to the accompanying drawings.

Figure 2:
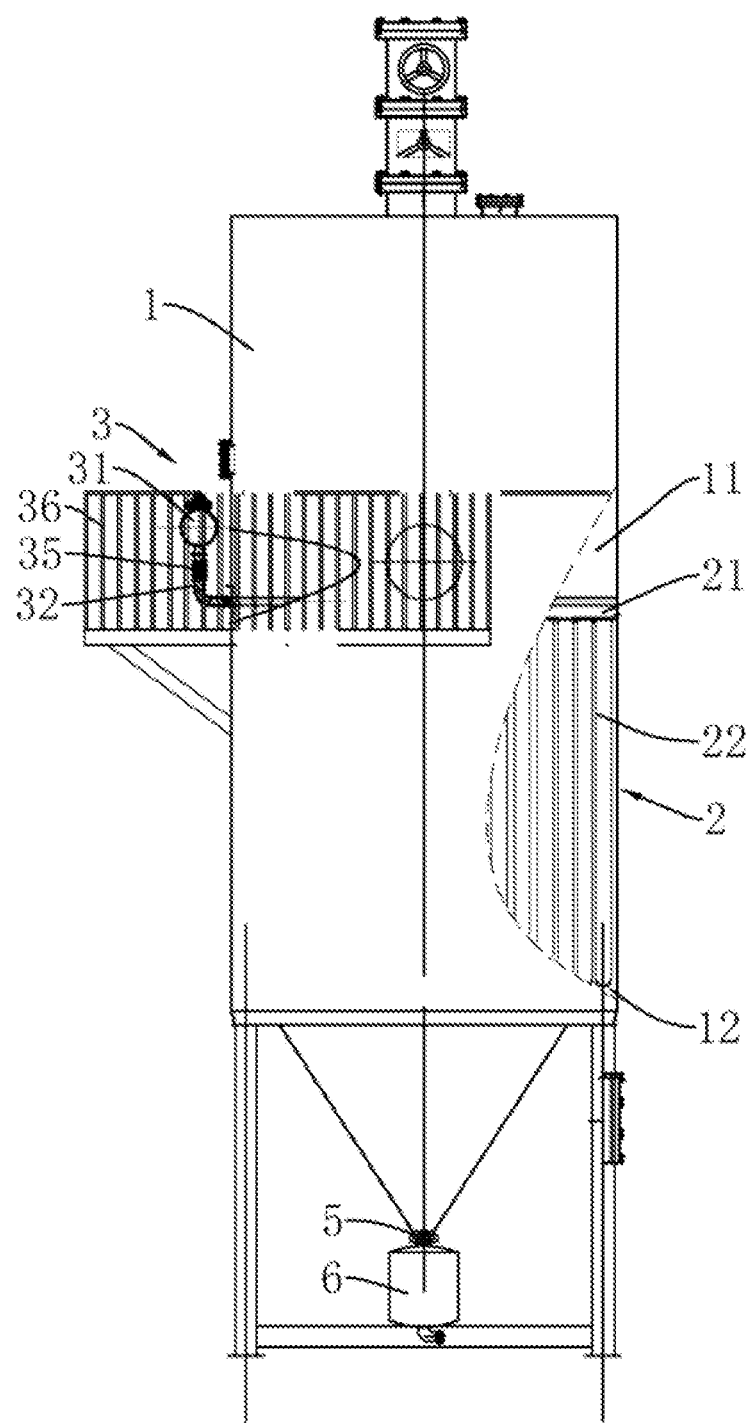
FIG. 2 is a left view of dust removal equipment according to an embodiment of the present disclosure.
Figure 3:
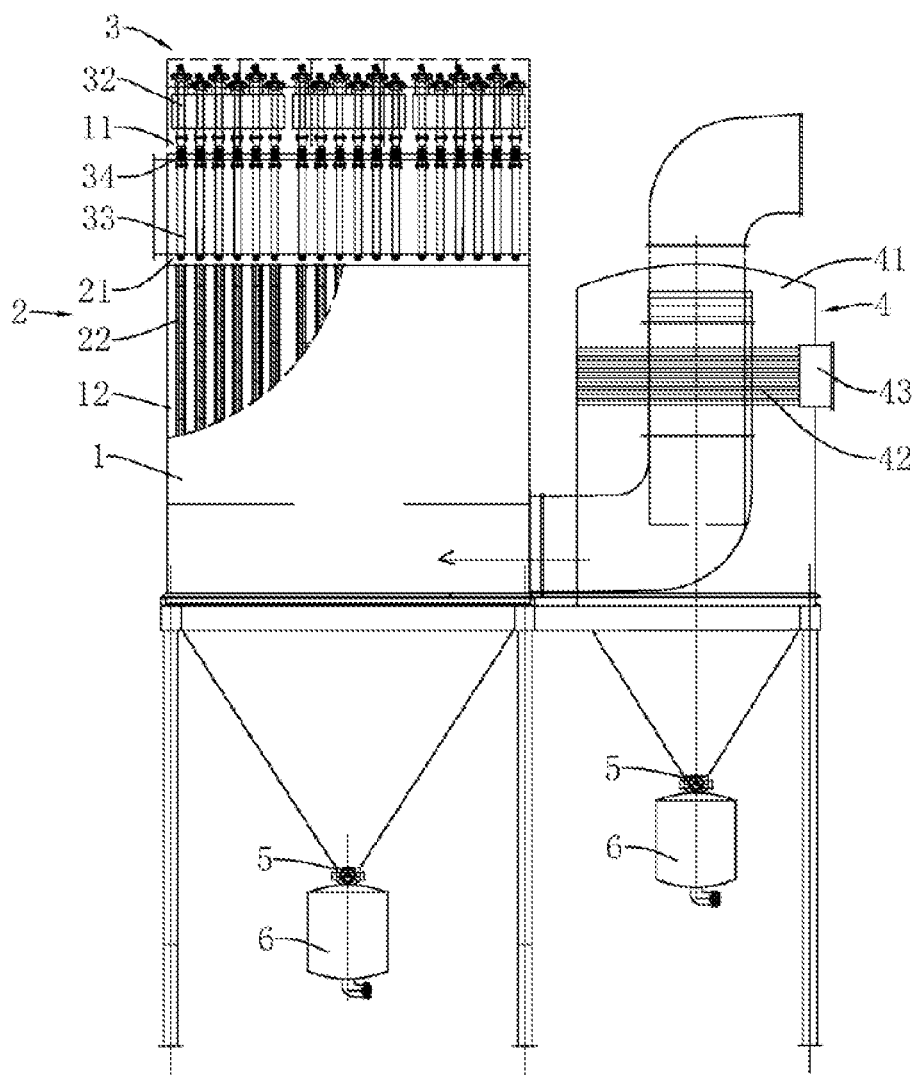
FIG. 3 is a front view of the dust removal equipment according to an embodiment of the present disclosure.

The embodiment of the present disclosure discloses high-temperature high-efficiency explosion-proof integrated modular dust removal equipment for pyrolysis raw coal gas. As shown in FIG. 2 and FIG. 3, the high-temperature high-efficiency explosion-proof integrated modular dust removal equipment for pyrolysis raw coal gas includes a housing 1, a high-temperature ceramic filter system 2, a high-pressure blowback system 3, and a preliminary dust removal system 4.

The housing 1 is internally provided with a chamber that enables a medium to flow in or flow out. A gas inlet and a gas outlet that are communicated with the chamber are formed in the outer side of the housing 1. The gas outlet is positioned above the gas inlet relatively. A heat-insulating layer coats outside the housing 1, which is used for reducing the interaction between the high-temperature housing 1 and the surrounding environment.

The high-temperature ceramic filter system 2 includes a mounting plate 21 and ceramic fiber filter tubes 22. The mounting plate 21 is horizontally fixed to an interior of the chamber of the housing 1 in a sealing manner to divide the chamber into an individual gas purification chamber 11 and an individual dust collection chamber 12 from top to bottom. The fixing mode of the mounting plate 21 may be the flange connection or the welding. The gas inlet of the housing 1 is communicated with the dust collection chamber 12, and the gas outlet thereof is communicated with the gas purification chamber 11. A gas pressure sensor is mounted in the gas purification chamber 11.

The main bodies of the ceramic fiber filter tubes 22 are straight tubular. One end of each ceramic fiber filter tube is closed, and the other end of each ceramic fiber filter tube is open. The material of the ceramic fiber filter tubes 22 is a composite material of SiC fibers and $ZrO_2$ ceramics. The pore size is 0.1 to 5 μm, and the porosity is about 33±2%.

Patterned holes are uniformly formed in the mounting plate 21. The ceramic fiber filter tubes 22 are arranged in a manner of multiple groups. Each group of ceramic fiber filter tube 22 is embedded into a corresponding one of the patterned holes of the mounting plate 21, so that the ceramic fiber filter tubes 22 are vertically distributed in the dust collection chamber 12. The open ends of the ceramic fiber filter tubes 22 and the sealing assembling points of the mounting plate 21 are assembled in a sealing manner.

The high-pressure backblow system 3 includes a blowback gas bag 31, blowback pipelines 32, and purging pipes 33. The blowback gas bag 31 is positioned outside the housing 1. The blowback gas bag 31 is fixedly mounted on the housing 1 by preparing a bracket 36. The blowback gas bag 31 can be connected to an air pump to provide the sustained high pressure for the blowback gas bag 31. The gas of the blowback gas bag 31 may be nitrogen.

One end of each blowback pipeline 32 is connected to the blowback gas bag 31, and the other end of each blowback pipeline 32 is introduced into the gas purification chamber 11 of the housing 1. The number of the purging pipes 33 is the same as that of the ceramic fiber filter tubes 22. Multiple purging pipes 33 are vertically distributed in the gas purification chamber 11 of the housing 1. The distribution positions of the purging pipes 33 are in one-to-one correspondence with those of the ceramic fiber filter tubes 22. Each of the upper ends of the purging pipes 33 is connected to a corresponding one of the blowback pipelines 32. Each of the lower ends of the purging pipes 33 penetrate through a corresponding one of the patterned holes and extend into the respective ceramic fiber filter tube 22. A control valve 34 is separately arranged at a joint between each purging pipe 33 and the corresponding blowback pipeline 32.

A double-pipe water cooler 35 is mounted at the part, positioned outside the housing 1, of blowback pipelines 32. The double-pipe water cooler 35 is used for controlling the temperature of the gas circulating in the blowback pipeline 32, and preventing the high temperature inside the housing 1 from being transferred into the blowback gas bag 31 to affect the stability of the high-pressure blowback gas.

The preliminary dust removal system includes a preliminary dust remover 41, a pipe-bundle-type air cooler 42, and a cooling fan 43. The preliminary dust remover 41 may be selected from a gravity dust remover or a spiral dust remover. In the present embodiment, the preliminary dust remover 41 is the gravity dust remover. A gas inlet of the preliminary dust remover 41 serves as an inlet of the high-temperature dust-containing raw coal gas, and is connected to an outlet of a coal gasification furnace 7. The gas outlet of the preliminary dust remover 41 is connected to a gas inlet of the housing 1. The flow velocity of gas flow of the raw coal gas that is introduced into the preliminary dust remover 41 is suddenly decreased and the flow direction of the gas flow is changed in the preliminary dust remover 41, so the large particle dust is separated from the gas flow and settled to the bottom of the preliminary dust remover 41 under the actions of gravity and inertial force.

The bottom of the preliminary dust remover 41 is formed to be a cone bottom, so as to serve as a dust collection bin to perform the preliminary collection on the settled dust. The bottom of the preliminary dust remover 41 is connected to a dust collection tank 6 through a cinder valve 5. The dust accumulated in the dust collection bin is finally discharged into the dust collection tank 6. The bottom of the housing 1 is also formed to be a cone bottom, and is provided with the mechanisms, such as the cinder valve 5 and the dust collection tank 6, so as to collect and discharge the dust.

The pipe-bundle-type air cooler 42 is mounted in the preliminary dust remover 41, and the cooling fan 43 is connected to the air cooler 42 to provide a cold source for a pipe type cooler. The cooling fan 43 and the air cooler 42 are cooperated to control the temperature of the raw coal gas in the preliminary dust remover 41 and control the temperature of the raw coal gas below 700° C., which ensures the normal and stable work of the high-temperature ceramic filter system 2.

Figure 4:
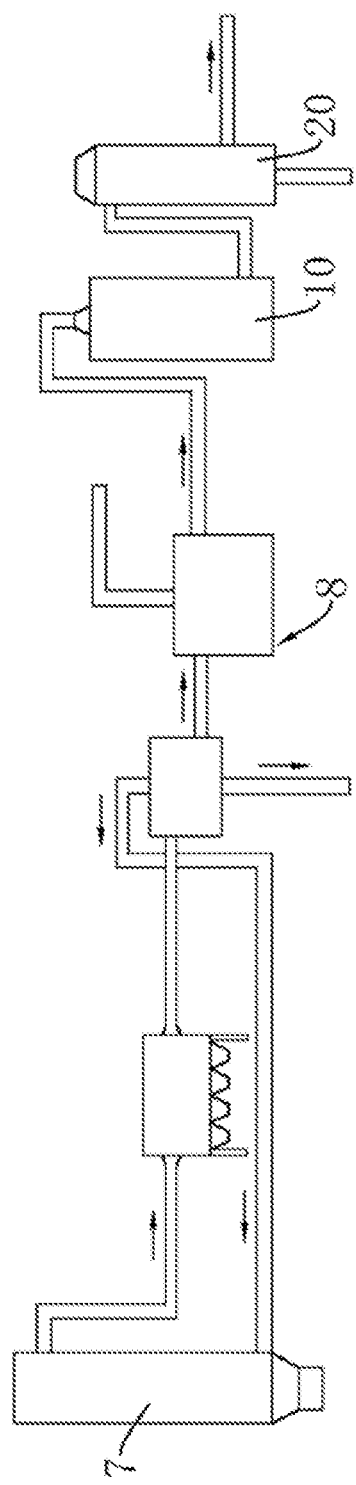
FIG. 4 is a schematic diagram of a dust removal process for the coal gasification using the dust removal equipment according to an embodiment of the present disclosure.

As shown in FIG. 4, there provides the process flow of removing dust in the coal gasification by using the high-temperature high-efficiency explosion-proof integrated modular dust removal equipment for pyrolysis raw coal gas of the present embodiment. The gas outlet of the housing 1 is externally connected to a high-power induced draft fan which pumps gas outwards discontinuously, so as to form a negative pressure in the gas purification chamber 11. Under the action of pressure, the high-temperature dust-containing raw coal gas is pumped from the coal gasification furnace 7 into the preliminary dust remover 41, so as to perform large-particle dust removal treatment. Meanwhile, the temperature of the high-temperature raw coal gas is finely adjusted below 700° C., and then the raw coal gas enters into the dust collection chamber 12 through the gas inlet of the housing 1.

Under the action of pressure, the coal gas enters the gas purification chamber 11 through the ceramic fiber filter tubes 22, and then is discharged from the gas outlet of the housing 1. However, dust particles are blocked outside the ceramic fiber filter tubes 22 to gradually form dust cakes on the outer surfaces of the ceramic fiber filter tubes 22.

Clean coal gas that is obtained through the dust removal treatment under the working condition of high temperature is transferred into a waste heat recovery system 8, so heat recovery and utilization is performed on the high-temperature clean coal gas, which improves the energy saving benefit of the system. Then, the clean coal gas flow is transferred into a washing tower 10, and the coal gas is deeply purified and cooled through the cooling water again. At this time, the temperature of the clean coal gas has basically reached the normal temperature, and the treated coal gas enters into a drop catcher 20, so that the liquid drops carried in the coal gas are caught. Finally, the coal gas is transported to a gas consumption point for use by a presser according to the required pressure.

In the dust removal process, the dust removal equipment is directly connected to an outlet of the coal gasification furnace 7 to effectively remove the dust of 0.3 μm contained in the raw coal gas under the working condition of 300° C. to 700° C. In this way, the requirement of the fine coal gas of 5 mg/Nm3 is satisfied after the primary filtration. The dust removal equipment has the advantages of strong acid resistance and alkali resistance, small thermal inertia, and ultra-long service life of 6 to 8 years. So, it is directly to solve the difficult problems of pipe blockage, sintering, and re-separation of the dust below 2 μm, and the like in the current coal gasification process. Furthermore, the risks of combustion and explosion in the safe production are reduced.

With the increase of working hours, the dust cakes outside the ceramic fiber filter tubes 22 are continuously thickened, so the filtering resistance force is continuously increased. A gas pressure sensor mounted in the gas purification chamber 11 detects the pressure in the gas purification chamber 11 in real time to calculate the filtration resistance. When the filtration resistance reaches a set value, the gas inlet and the gas outlet of the housing 1 are closed; the control valve 34 is opened; and the gas in the blowback gas bag 31 is ejected from the purging pipes 33 at a high speed through an air pump, so as to perform backblow on the ceramic fiber filter tubes 22 to clean dust. The dust cakes fall into the bottom of the housing 1 under the action of gravity. After self-cleaning is completed, the control valve 34 is closed, and the gas inlet and the gas outlet of the housing 1 are opened, so as to continue cleaning the high-temperature dust-containing coal gas.

The present specific embodiment is merely an interpretation of the present disclosure, but not a limitation to the present disclosure. Those skilled in the art can make modifications to the embodiment without creative contribution after reading the description, but the modifications are protected by the patent law as long as they are within the scope of the claims of the present disclosure.

What is claimed is:

1. An explosion-proof integrated modular dust removal equipment for pyrolysis raw coal gas, the equipment comprising:
    a housing internally provided with a chamber that enables a medium to flow from a gas inlet of the housing to a gas outlet of the housing;
    a ceramic filter system, the ceramic filter system configured to divide the chamber of the housing into a dust collection chamber and a gas purification chamber that are separate, the ceramic filter system positioned in the dust collection chamber and configured to permit communication between the dust collection chamber and the gas purification chamber;
    a high-pressure backblow system, the high-pressure backblow system mounted in the gas purification chamber, and configured to perform a backblow operation towards the dust collection chamber; and
    a preliminary dust removal system, the preliminary dust removal system positioned outside the housing, and in communication with the dust collection chamber, the preliminary dust removal system comprising a preliminary dust remover and a cinder valve mounted at a bottom of the preliminary dust remover,
    wherein a gas inlet of the preliminary dust remover is in communication with a raw gas source, and a gas outlet of the preliminary dust remover is in communication with the dust collection chamber, and
    wherein an air cooler is mounted inside the preliminary dust remover, and a fan is mounted on the air cooler.

2. The explosion-proof integrated modular dust removal equipment for pyrolysis raw coal gas according to claim 1, wherein the ceramic filter system comprises:
    a mounting plate with patterned holes; and
    ceramic fiber filter tubes each of which is arranged in a corresponding one of the patterned holes of the mounting plate,
    wherein the chamber of the housing is horizontally partitioned by the mounting plate, and
    wherein the ceramic fiber filter tubes are vertically arranged in the dust collection chamber.

3. The explosion-proof integrated modular dust removal equipment for pyrolysis raw coal gas according to claim 2, wherein the ceramic fiber filter tubes are made of a ceramic material, wherein pore size ranges of the ceramic fiber filter tubes are each 0.1-5 μm, and wherein porosity ranges of the ceramic fiber filter tubes are each 30-40%.

4. The explosion-proof integrated modular dust removal equipment for pyrolysis raw coal gas according to claim 2, wherein the high-pressure backblow system comprises a blowback gas bag mounted outside the housing, purging pipes mounted in the gas purification chamber, and blowback pipelines that each connect the blowback gas bag and a corresponding one of the purging pipes;
    wherein the purging pipes and the ceramic fiber filter tubes are equal in number,
    wherein distribution positions of the purging pipes are in one-to-one correspondence with distribution positions of the ceramic fiber filter tubes and an output end of each of the purging pipes extends into a corresponding one of the ceramic fiber filter tubes, and
    wherein a control valve is individually provided between each of the blowback pipelines and the corresponding one of the purging pipes.

5. The explosion-proof integrated modular dust removal equipment for pyrolysis raw coal gas according to claim 4, wherein a double-pipe water cooler is mounted outside each of the purging pipes.

6. The explosion-proof integrated modular dust removal equipment for pyrolysis raw coal gas according to claim 1, wherein the preliminary dust remover is a gravity type dust remover or a spiral type dust remover.

7. The explosion-proof integrated modular dust removal equipment for pyrolysis raw coal gas according to claim 1, wherein a gas that is blown back in the high-pressure backblow system is nitrogen.

8. The explosion-proof integrated modular dust removal equipment for pyrolysis raw coal gas according to claim 1, wherein a heat-insulating layer is coated outside the housing.

* * * * *